(12) United States Patent
Wei et al.

(10) Patent No.: US 8,909,480 B2
(45) Date of Patent: Dec. 9, 2014

(54) SEISMIC DATA FILTERING BASED ON VIBRATOR-COUPLED GROUND MODEL

(75) Inventors: Zhouhong Wei, Sugar Land, TX (US); Thomas Phillips, Richmond, TX (US)

(73) Assignee: Inova, Ltd., George Town (KY)

( * ) Notice: Subject to any disclaimer, the term of this patent is extended or adjusted under 35 U.S.C. 154(b) by 530 days.

(21) Appl. No.: 13/273,997

(22) Filed: Oct. 14, 2011

(65) Prior Publication Data
US 2012/0271551 A1 Oct. 25, 2012

Related U.S. Application Data

(60) Provisional application No. 61/393,106, filed on Oct. 14, 2010.

(51) Int. Cl.
G01V 1/28 (2006.01)
G01V 1/36 (2006.01)
G01V 1/047 (2006.01)
G01V 1/37 (2006.01)

(52) U.S. Cl.
CPC ... G01V 1/37 (2013.01); *G01V 1/28* (2013.01); *G01V 1/282* (2013.01); *G01V 1/364* (2013.01); *G01V 1/36* (2013.01); G01V 1/0475 (2013.01)
USPC .............................................. 702/17; 702/14

(58) Field of Classification Search
CPC ......... G01V 1/364; G01V 1/28; G01V 1/282; G01V 1/3808; G01S 15/8915; G01P 21/00; G01P 15/18; A61N 1/3627; A61N 1/36542; A61N 1/36578
USPC .................. 367/24, 38, 73; 702/11, 14, 16, 17
See application file for complete search history.

(56) References Cited

U.S. PATENT DOCUMENTS

| 3,208,550 | A | | 9/1965 | Castanet |
| 4,750,157 | A | * | 6/1988 | Shei ................................ 367/45 |
| 6,161,076 | A | * | 12/2000 | Barr et al. ....................... 702/17 |
| 7,327,633 | B2 | * | 2/2008 | Bagaini et al. .................. 367/45 |
| 8,280,651 | B2 | * | 10/2012 | Rensing et al. ................. 702/56 |
| 2005/0267695 | A1 | | 12/2005 | German |
| 2005/0278127 | A1 | * | 12/2005 | Griffin et al. .................... 702/56 |
| 2007/0133354 | A1 | * | 6/2007 | Bagaini et al. ................. 367/189 |
| 2007/0230268 | A1 | * | 10/2007 | Hoogeveen et al. ............ 367/19 |
| 2007/0240930 | A1 | | 10/2007 | Wei et al. |
| 2007/0242563 | A1 | * | 10/2007 | Kamata ........................... 367/38 |

(Continued)

OTHER PUBLICATIONS

Z. Wei, "Estimation of Ground Stiffness, Ground Viscosity and Captured Ground Mass Using Vibrator Field Measurements", Jun. 9-12, 2008, 70th EAGE Conference & Exhibition—Rome, Italy.*

(Continued)

*Primary Examiner* — Eliseo Ramos Feliciano
*Assistant Examiner* — I-Hui E Liu
(74) *Attorney, Agent, or Firm* — Dorsey & Whitney LLP

(57) ABSTRACT

A vibrator-coupled ground filter improves seismic data recorded during a seismic operation. This filter is based on a ground model that takes into consideration the vibrator system, the coupling system between the baseplate and captured ground, and the coupled ground system. Using acceleration data from the baseplate and the reaction mass, the ground model can be used to derive particular variables for the ground model to help characterize the system. Using the derived variables in a ground filter, the recorded seismic data can be corrected to remove errors in the trace data produced by typical assumptions.

2 Claims, 14 Drawing Sheets

(56) References Cited

U.S. PATENT DOCUMENTS

| | | | |
|---|---|---|---|
| 2007/0250269 A1 | 10/2007 | Wei et al. | |
| 2008/0201089 A1* | 8/2008 | Diaz et al. | 702/56 |
| 2009/0210158 A1* | 8/2009 | German | 702/2 |
| 2010/0276224 A1 | 11/2010 | Wei | |
| 2011/0164470 A1 | 7/2011 | Wei et al. | |

OTHER PUBLICATIONS

J.J. Sallas and R.M. Weber, "Comments on "The Amplitude and Phase Response of a Seismic Vibrator"", 1982, Geophysical Prospecting 30, p. 935-938.*

Mark H. Richardson and David L. Formenti, "Parameter Estimation from Frequency Response Measurements Using Rational Fraction Polynomials", Nov. 1982, Presented at 1st IMAC Conference, Orlando, FL.*

PCT International Search Report and Written Opinion dated May 29, 2012, PCT Application No. PCT/US2011/056409, 8 pages.

Aritman, B. C., "Repeatability study of seismic source signatures," Geophysics, 66, 1811-1817 (2001).

Bickel S. H., "The effects of noise on minimum-phase Vibroseis deconvolution" Geophysics, 47, 1174-1184 (1982).

Brötz R., Marschall R and Knecht M., "Signal adjustment of Vibroseis and impulsive source data," Geophysical Prospectin, 35, 739-766 (1987).

Brittle K. F. and Lines L. R "Vibroseis deconvolution: An example from Pikes Peak, Saskatchewan," CSEG Recorder, 26, 28-32 (2001).

Brittle K. F., Lines L R. and Dey A. K., "Vibroseis deconvolution: a comparison of cross-correlation and frequency-domain sweep deconvolution," Geophysical Prospecting, 49, 675-686 (2001).

Bagaini C. "Overview of simultaneous Vibroseis acquisition methods," SEG Expanded Abstracts, 70-74 (2006).

Crawford J. M., Doty W. E. N. and Lee M. R., "Continuous signal seismograph," Geophysics, 25, 95-105 (1960).

Gibson B. and Lamer K., "Predictive deconvolution and the zero-phase source," Geophysics, 49, 379-397, (1984).

Baeten G. and Strijbos F., "Wave field of a vibrator on a layered half-space: theory and practice," SEG, Expanded Abstracts, 92-96 (1988).

Jeffryes B. P., "Far-field harmonic measurement for seismic vibrators," SEG Expanded Abstract, 60-63 (1996).

Klauder J. R., Price A.C., Darlington S. and Albersheim W. J., "The theory and design of chirp radars," Bell System Technical Journal, 39, 745-807 (1960).

Lebedev A. V. and Beresnev I. A., "Nonlinear distortion of signals radiated by vibroseis sources," Geophysics, 69, 968-977 (2004).

Lebedev A. and Beresnev I., "Radiation from flexural vibrations of the baseplate and their effect on the accuracy of traveltime measurements," Geophysical Prospecting, 53, 543-555 (2005).

Lines L. R. and Clayton R. W., "A new approach to Vibroseis deconvolution," Geophysical Prospecting, 25, 417-433 (1977).

Martin J. E. and Jack I. G. The behavior of a seismic vibrator using different phase control methods and drive levels. First Break, 8, 404-414 (1990).

Miller G. F. and Pursey H., "The field and radiation pattern of mechanical radiators on the free surface of a semi-infinite isotropic solid," Proceedings of Royal Society (London), A223, 521-541 (1954).

Mewhort L., Bezdan S. and Jones M., "Does It Matter What Kind of Vibroseis Deconvolution is Used?" CSEG Geophysics, 1-4 (2002).

Meunier J. and Bianchi T., "Harmonic noise reduction opens the way for array size reduction in vibroseis operations," SEG Expanded Abstracts, 70-73 (2002).

Meunier J. and Bianchi T., "Cost-Effective, High-Density Vibroseis Acquisition," SEG Expanded Abstracts, 44-48(2005).

Sallas J. J. and Weber R. M., "Comments on 'The amplitude and phase response of a seismic vibrator' by W.E. Lerwill," Geophysical Prospecting, 30, 935-938 (1982).

Sallas J. J., "Seismic vibrator control and the downgoing P-wave," Geophysics, 49, 732-740 (1984).

Sallas J. J., Amiot E. and Alvi H., "Ground force control of a P-wave vibrator," SEG 1985 seismic field techniques workshop, Aug. 13-16, 1985, Monterrey, California.

Saragiotis C., Scholtz P. and Bagaini C., "On the accuracy of the ground force estimated in vibroseis acquisition," Geophysical Prospecting, 58, 69-80 (2010).

Walker D., "Harmonic resonance structure and chaotic dynamics in the earth-vibrator system," Geophysical Prospecting, 43, 487-507 (1995).

Wei Z., Sallas J. J., Crowell J. M. and Teske J. E., "Harmonic distortion reduction on vibrators—Suppressing the supply pressure ripples," SEG Expanded Abstract, 51-55 (2007).

Wei, Z., "Design of a P-wave seismic vibrator with advanced performance," GeoArabia, 13, 123-136 (2008).

Wei Z., "Reducing Harmonic Distortion on Vibrators—Stiffening the Vibrator Baseplate," Expanded Abstract B006, 70th EAGE meeting, Rome, Italy (2008).

Wei Z., "Estimation of Ground stiffness, Ground Viscosity and Captured Ground Mass using Vibrator Field Measurements," Expanded Abstract P144, 70th EAGE meeting, Rome, Italy (2008).

Wei Z., "How good is the weighted-sum estimate of the vibrator ground force?" Leading Edge, 28, 960-965 (2009).

Wei Z., "Reducing harmonic distortion on vibrators at low frequencies—Servo-valve flow linearization," Expanded Abstract S002, 71th EAGE meeting, Amsterdam, The Netherlands (2009).

Wei Z., "Modelling and modal analysis of seismic vibrator baseplate," Geophysical Prospecting, 58, 19-31 (2010).

Wei Z. and Phillips T. F., "Harmonic distortion reduction on seismic vibrators," Leading Edge, 29, 256-261 (2010).

Ziolkowski A., "Why don't we measure seismic signature?" Geophysics, 26, 190-201 (1991).

Ziolkowski A., "Seismic wavelet estimation without the invalid whiteness assumption," CSEG Recorder, Jun. 18-28, 2001.

Ziolkowski A., "Review of vibrosies data acquisition and processing for better amplitudes: adjusting the sweep and deconvolving for the time-derivative of the true groundforce," Geophysical Prospecting, 58, 41-53 (2010).

* cited by examiner

SEISMIC DATA FILTERING BASED ON VIBRATOR-COUPLED GROUND MODEL

CROSS-REFERENCE TO RELATED APPLICATIONS

This is a non-provisional of U.S. Pat. Appl. No. 61/393,106, filed 14 Oct. 2010, which is incorporated herein by reference in its entirety and to which priority is claimed.

BACKGROUND OF THE DISCLOSURE

The oil and gas exploration industry employ geophysical tools and techniques to identify a subterranean structure having potential hydrocarbon deposits. Commonly referred to as seismic exploration, these techniques and tools generate an image of subsurface structures by recording energy in the form of vibrations reflected or refracted from geologic formations. In seismic exploration, for example, seismic waves generated by a source and imparted into the ground reflect off rocks in the subsurface. Boundaries between different rocks often reflect seismic waves, and information relating to these waves is collected and processed to generate a representation or images of the subsurface.

When seismic waves generated by the source reach a bedding plane separating rocks of different acoustic density, then a portion of the waves reflects back to the surface, causing the ground surface to rise or fall depending on whether the expansion or compression phase of the wave is being recorded. The remaining portion of the waves is refracted and diffracted. A two-dimensional image, which is called a seismic line, is essentially a cross-sectional view of the earth oriented parallel to the line of geophones. The information may also be collected as an intersecting grid of seismic lines referred to as a 3-D seismic volume.

Any number of exploration systems can gather the desired information for processing. Dynamite explosions, vibrator trucks, air guns or the like can create the seismic waves. Sensors such as velocity geophones, accelerometers, and/or hydrophones can be laid out in lines, or towed in the case of hydrophones, to measure how long it takes the waves to leave the seismic source, reflect off a rock boundary, and return to the sensors used.

An example seismic system 10 in FIG. 1 can generate geophysical information to image earth subsurface structures. The system 10 has a central controller/recorder 90 in communication with a seismic acquisition array 12 known as a spread. The array 12 has spaced sensor stations 20, which can each have one or more sensors 22. The sensors 22 measure geophysical information and can include 3-component sensors for obtaining 3-dimensional energy known as 3D seismic. The sensors 22 can include accelerometers, velocity geophones, microphones, or the like, and the array 12 can be deployed on land or a seabed location.

A seismic source 30 imparts acoustic energy into the ground, and the sensors 22 receive energy after reflection and refraction at boundaries in subsurface structures. The array 12 then communicates sensor data with the central controller or recorder 90 using wireless technology or other communication technique.

To impart the acoustic energy, the seismic source 30 can be a vibrator, such as shown in FIG. 2, although other types of sources can be used. The vibrator 30 transmits force to the ground using a baseplate 70 and a reaction mass 50. As is typical for land seismic, the vibrator 30 is mounted on a carrier vehicle (not shown) that uses bars 32/34 to lower the vibrator 30 to the ground. With the vibrator 30 lowered, the weight of the vehicle holds the baseplate 70 engaged with the ground so seismic source signals can be transmitted into the earth.

The reaction mass 50 positions directly above baseplate 70 and stilts 52 extend from the baseplate 70 and through the mass 50 to stabilize it. Internally, the reaction mass 50 has a cylinder 56 formed therein. A vertically extending piston 60 extends through this cylinder 56, and a head 62 on the piston 60 divides the cylinder 56 into chambers. The ends of the piston 60 connect to cross-pieces 54U-L that connect to the stilts 52.

Feet 36 with isolators 40 isolate the baseplate 70 from the bars 34, and tension members 42 interconnect between the feet 36 and the baseplate 70. The tension members 42 hold the baseplate 70 when the vibrator 30 is raised and lowered to the ground. Finally, shock absorbers 44 are also mounted between the bottom of the feet 36 and the baseplate 70 to isolate vibrations therebetween.

During operation, a controller 80 receives signals from a first sensor 85 that measures acceleration of the baseplate 70 and receives signals from a second sensor 87 that measure acceleration of the reaction mass 50. Based on feedback from these sensors 85/87 and a desired sweep signal for operating the vibrator 30, the controller 80 generates a pilot signal to control a servo valve assembly 82. Driven by the drive signal, the servo valve assembly 82 alternatingly routes hydraulic fluid between a hydraulic fluid supply 84 and the piston 60. The reaction mass 50 reciprocally vibrates on the piston 60. In turn, the force generated by the vibrating mass 50 transfers to the baseplate 70 via the stilts 52 and the piston 60 so that the baseplate 70 vibrates at a desired amplitude and frequency or sweep to generate a seismic source signal into the ground.

As the moving reaction mass 50 acts upon the baseplate 70 to impart a seismic source signal into the earth, the signal travels through the ground, reflects at discontinuities and formations, and then travels toward the earth's surface. At the surface, the array 12 of FIG. 1 having the geophone receivers or other sensors 22 coupled to the ground detect the reflected signals, and the recorder 90 of FIG. 1 records the seismic data 92 received from the geophone receivers 22.

At some point, a data processing system 98 receives the seismic data 92 from the seismic recorder 90. (The seismic data 92 can also include recorded data from the seismic vibrator 30 if information such as pilot signal, acceleration data, and weighted sum ground force are stored separately.) The data processing system 98 can use a correlation processor to correlate the computed ground force supplied by the vibrator 30 to the seismic data 92 received by the geophone receivers 22. Ultimately, the correlated information can be used to create an image or representation of the earth's subsurface structures.

When operating such a prior art vibrator 30, operators experience problems in accurately determining the ground force that the vibrator 30 is applying to the ground and in accurately correlating the vibrator's operation with the generated source signal. Ideally, operators would like to know the actual ground force applied by the baseplate 70 to the ground when imparting the seismic energy. As shown in FIG. 2, a local sensor 85 (e.g., accelerometer or geophone) is typically positioned on the upper cross piece 54U of the vibrator 50, which positions above the reaction mass 50.

In operation, the controller 80 shown in FIG. 2 measures the signal imparted into the ground using the local sensor 85 located on the upper cross-piece 54U and using the sensor 87 located on the reaction mass 50. When the data processing system 98 of FIG. 1 receives the seismic data 92 making up the seismic spread, it also receives the acceleration signals from these sensors 85/87 on the source 30. The system 98's correlation processor then uses various algorithms to distinguish wave signal data from distortions and other spurious signals.

A problem with this method is that original source signal distortion may vary and make correlation difficult. When calculated ground force signals at the vibrator 30 are cross-correlated with far-field signals measured in the field, the results may be corrupted by unrealistic assumptions used in modeling the system 10. In particular, the vibrator 30 works on the surface of the ground, which can vary dramatically from location to location due to the presence of sand, rock, vegetation, etc. Thus, the baseplate 70 is often not evenly supported when deployed against the ground at a given location. In addition, the baseplate 70 will flex and directly affect the control system during operation. As a result, the radiated energy produced can vary from location to location depending on where the vibrator 30 is deployed. Therefore, the vibrator's source signature is not the same (or nearly the same) from location to location and is not characteristically repeatable, which is desirable when performing seismic analysis. Thus, a more accurate knowledge of the source signal imparted into the ground by the source 30 can make the correlation easier at the data processing stage.

The subject matter of the present disclosure is directed to overcoming, or at least reducing the effects of, one or more of the problems set forth above.

SUMMARY OF THE DISCLOSURE

A vibrator-coupled ground filter improves seismic data recorded during a seismic operation. This filter is based on a ground model that takes into consideration the vibrator system, the coupling system between the baseplate and captured ground, and the coupled ground system. Using acceleration data from the baseplate and the reaction mass, the ground model can be used to derive particular variables for the ground model to help characterize the system. Using the derived variables in the ground filter, the recorded seismic data can be corrected to remove errors in the trace data produced by typical assumptions.

In a seismic data processing method, for example, acceleration data of a reaction mass and a baseplate of a source of seismic energy is obtained as well as seismic data of one or more seismic sensors responsive to the seismic energy of the source. Variables for a ground model are derived by analyzing a frequency response relating the reaction mass acceleration data and the baseplate acceleration data as input and output relative to one another. Using the ground model with the derived variables, a source signal indicative of operation of the source is filtered. This source signal can be a pilot signal or a weighted ground force sum. The filtered source signal is available for processing with the seismic data of the one or more seismic sensors so the seismic data can be correlated with the filtered source signal.

In a seismic data processing apparatus, for example, memory stores a ground model, a source signal indicative of operation of a source of seismic energy, acceleration data of a reaction mass and baseplate of the source, and seismic data of one or more seismic sensors responsive to the seismic energy of the source. One or more processing units are operatively coupled to the memory. The one or more processing units analyze a frequency response relating the reaction mass acceleration data and the baseplate acceleration data as input and output relative to one another and derive variables for the ground model based on the analyzed frequency response. The one or more processing units filter the source using the ground model with the derived variables and make the filtered source signal available for processing with the seismic data so the seismic data can be correlated with the filtered source signal.

The foregoing summary is not intended to summarize each potential embodiment or every aspect of the present disclosure.

DETAILED DESCRIPTION OF THE DISCLOSURE

A. Seismic System

Figure 3:
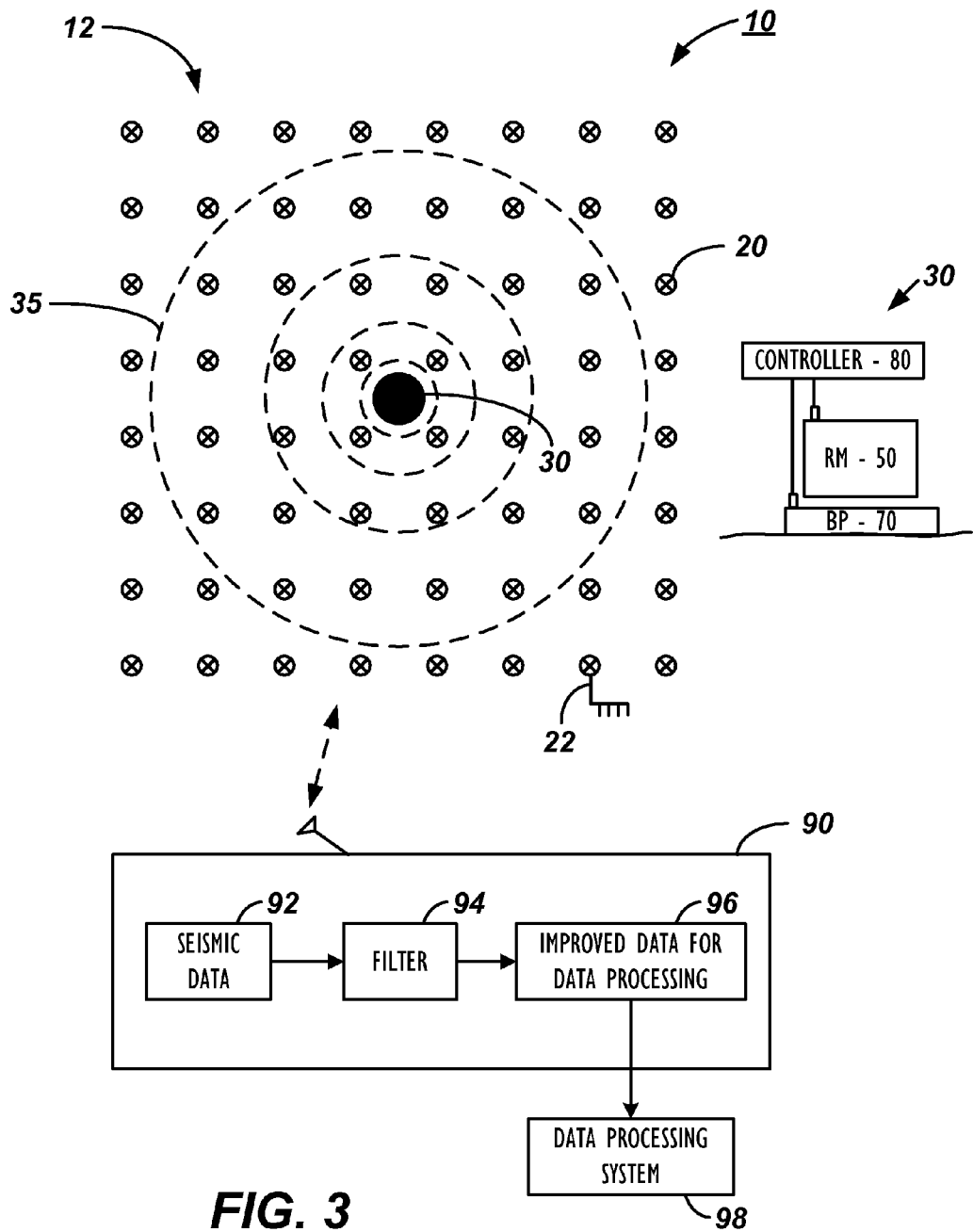
FIG. 3 illustrates a seismic system for generating geophysical information according to the present disclosure.

An example seismic system 10 in FIG. 3 can generate geophysical information to image earth subsurface structures. The system 10 has a central controller/recorder 90 in communication with a seismic acquisition array 12 known as a spread. As before, the array 12 has spaced sensor stations 20, which can each have one or more sensors 22. The sensors 22 measure geophysical information and can include 3-component sensors for obtaining 3-dimensional energy known as 3D seismic. The sensors 22 can include accelerometers, velocity geophones, microphones, or the like, and the array 12 can be deployed on land or a seabed location.

Figure 1:
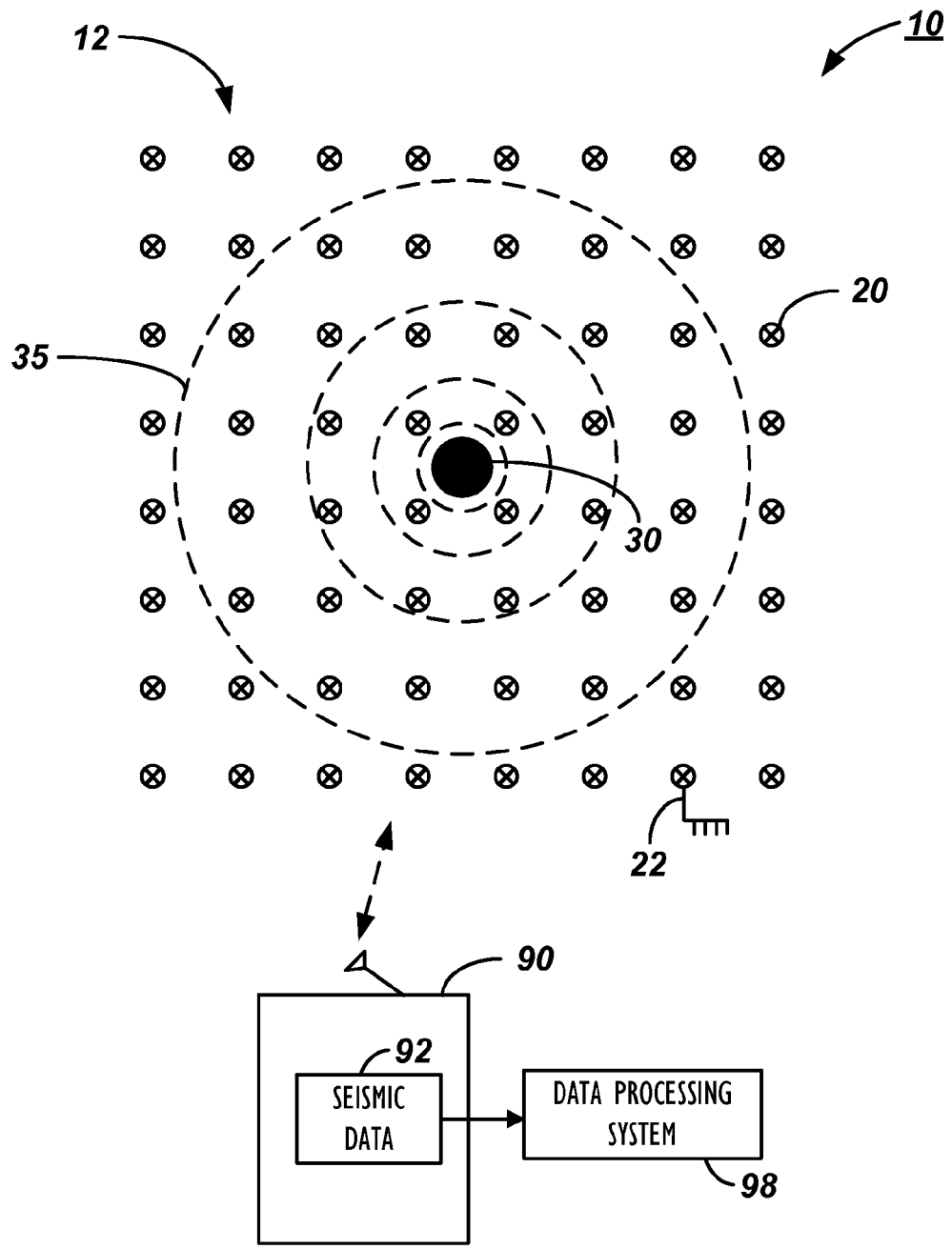
FIG. 1 illustrates a seismic system for generating geophysical information according to the prior art.
Figure 2:
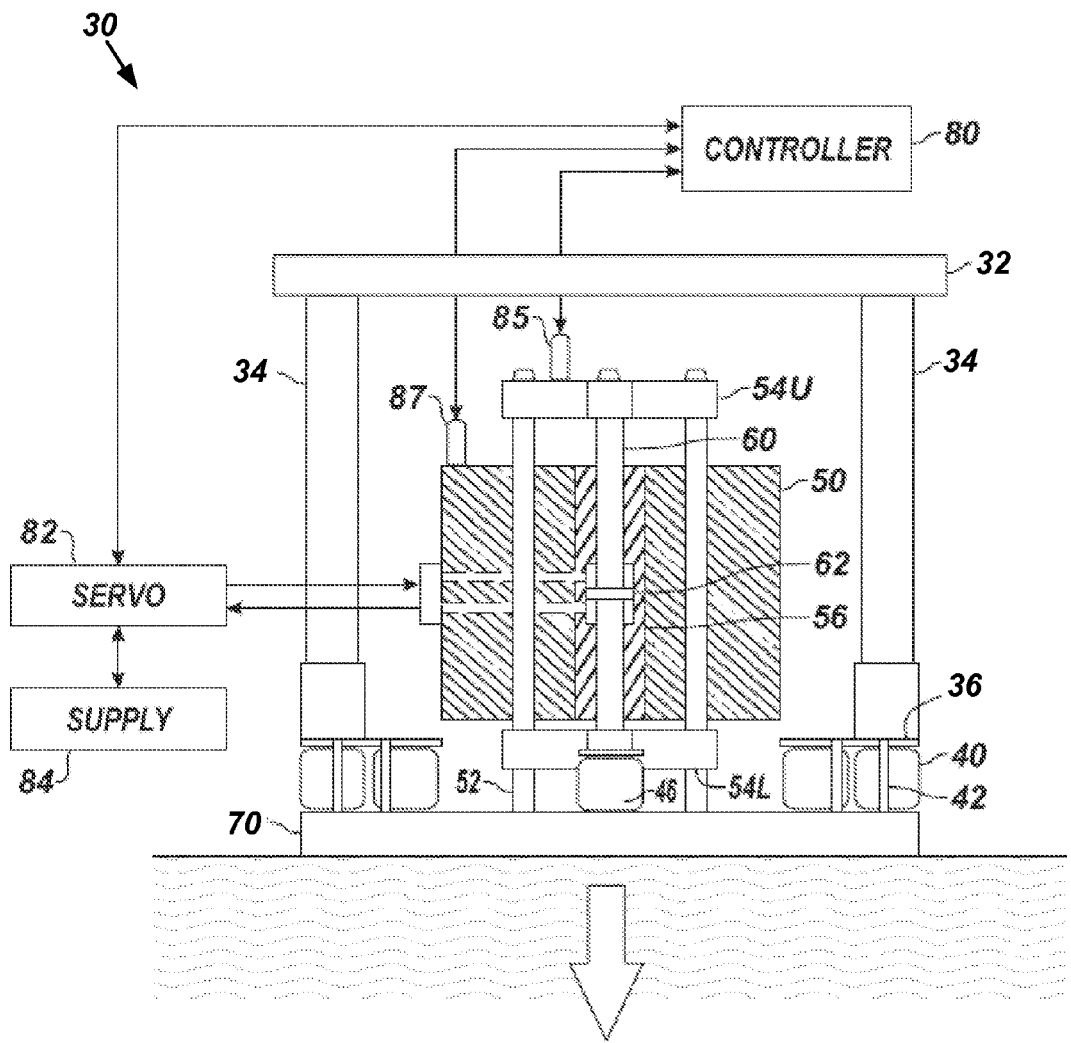
FIG. 2 schematically illustrates a prior art vibrator.

As before, a seismic source 30 imparts acoustic energy into the ground, and the sensors 22 receive energy after reflection and refraction at boundaries in earth subsurface structures. The seismic source 30 can be similar to the vibrator disclosed previously with reference to FIG. 2. For the benefit of the present discussion, reference is made to the components of the vibrator 30 of FIG. 2, including a reaction mass 50, a baseplate 70, and a controller 80 as diagramed in FIG. 3. However, the seismic source 30 according to the present disclosure need not necessarily be a hydraulically operated vibrator. Instead, the seismic source 30 can be a seismic vibrator have an electric motor, can have an internal or external drive, and can generate seismic shear waves (S-waves) or seismic compression waves (P-waves). In general, the vibrator 30 can be any type of vibrator having a controller 80 and having a reaction mass 50 and a baseplate 70 for imparting energy into the ground.

As before, the moving reaction mass 50 acts upon the baseplate 70 of the vibrator 30 to impart seismic source signals into the ground. The signals travel through the ground, reflect at discontinuities and formations, and then travel toward the earth's surface. At the surface, the array 12 having the geophone receivers 22 coupled to the earth detects the reflected signals, and the array 12 communicates seismic data with the central controller or recorder 90 using wireless technology or other communication technique.

The recorder 90 records the seismic data 92 from the geophone receivers 22. At some point, a data processing system 98 is employed to process the seismic data 92. (The seismic data 92 can also include recorded data from the seismic vibrator 30 if information such as pilot signal, acceleration data, and weighted sum ground force are stored separately.) To improve the subsequent imaging produced by the data processing system 98, a vibrator-coupled ground filter system 94 according to the present disclosure is used to refine or improve the original seismic data 92 so that the improved data 96 can be provided to the data processing system 98. When this is done, the data processing system 98 can use its correlation processor (not shown) to correlate a computed ground force from the information supplied by the vibrator 30 to the seismic data 96 and can ultimately provide more clear data for seismic imaging.

As noted previously, the vibrator's controller 80 measures the acceleration data from local sensors. Part of the seismic data 92 received at the recorder 90 includes the acceleration data for both the baseplate 70 and reaction mass 50 of the vibrator 30 from such local sensors. The dynamic motions related to the coupling conditions of the vibrator 30 are recorded and embedded in the baseplate acceleration data. In addition, the motion of the vibrator's actuator (e.g., hydraulic system) is recorded and embedded in the reaction mass acceleration data. These measurements are recorded during data acquisition using the recorder 90 and are used by the filter system 94 to process the data. In particular, the ground filter system 94 uses this acceleration data and a model of the coupling between the vibrator 30 and the ground to filter or correct the seismic data 92 before processing with the data processing system 98.

Before turning to particular details of the filter system 94, discussion first focuses on a vibrator-coupled ground model used for the filter system 94.

B. Vibrator-Coupled Ground Model

As noted above, the vibrator 30 works on the earth surface where the surface medium can change dramatically from location to location. When the vibrator's baseplate 70 is coupled with the ground by applying the hold-down weight force to the baseplate 70, the baseplate 70 and the coupled ground join together and become one system. Due to the low rigidity of the baseplate 70 and variant surface conditions, the vibrator-coupled ground model can be a complex system.

Figure 4:
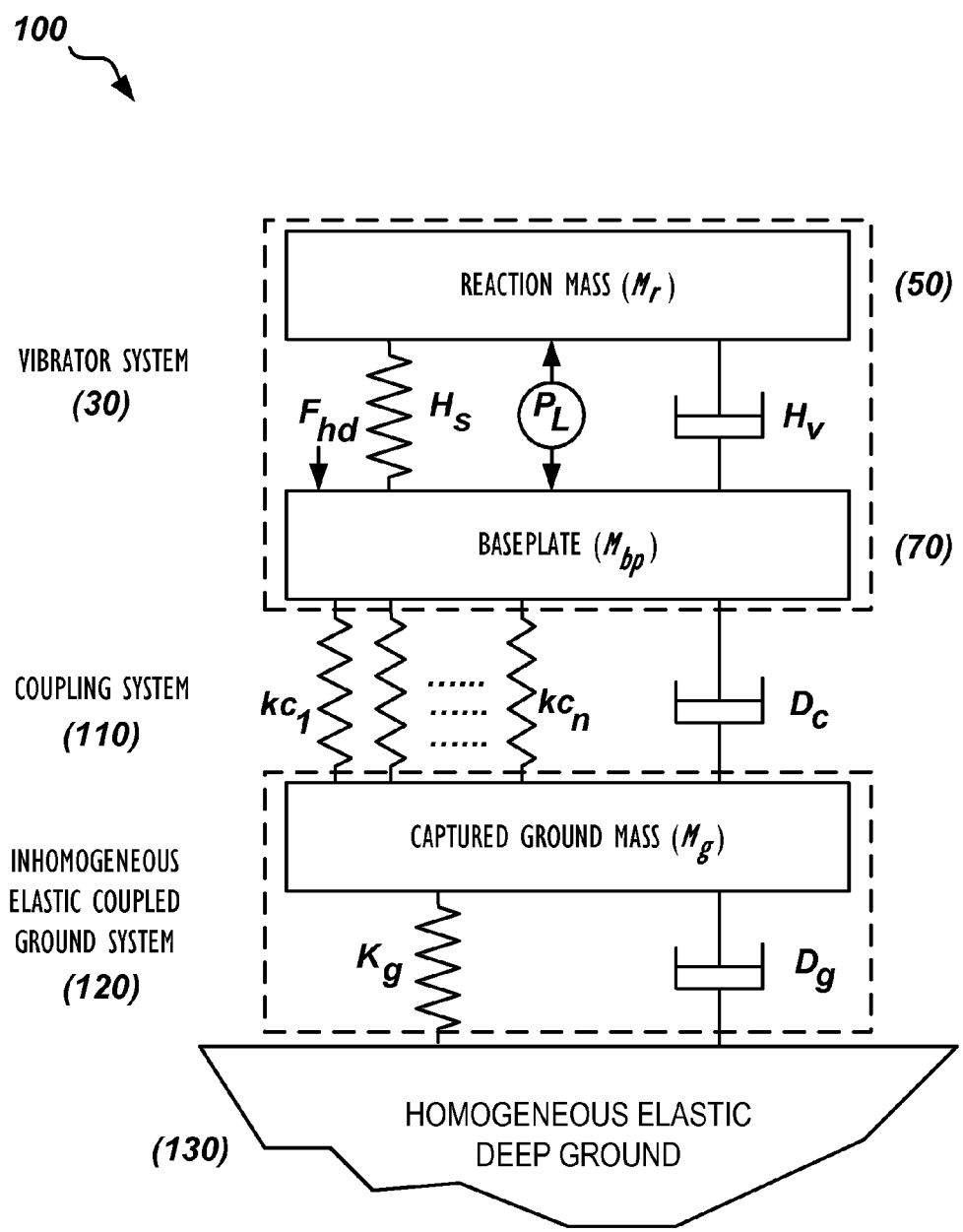
FIG. 4 schematically illustrates a vibrator-coupled ground model according to the present disclosure.

FIG. 4 diagrammatically depicts a vibrator-coupled ground model 100 according to the present disclosure. In addition to the vibrator system 30, the ground model 100 has three subsystems, which include a coupling system 110, an inhomogeneous and elastic coupled ground system 120, and a homogenous elastic deep ground 130. These subsystems express the complicated transmission of the Vibroseis wavelet from the vibrator system (30) to the ground (130).

The vibrator-coupled ground model 100 expresses the rigidity of the baseplate 70 as part of non-ideal contact stiffness present at the boundary interaction of the baseplate 70 and the ground. This model 100 can serve as a more realistic representation of the vibrator-ground interaction and can describe a wide range of non-linear contact behavior (such as a partial contact and a full contact).

In FIG. 4, the ground system 120 is described as a linear second-order system that consists of a ground mass $M_g$, a ground stiffness $K_g$, and a ground viscosity $D_g$. The vibrator system 30 is also treated as a linear and rigid body. In this model 100, the baseplate 70 is only considered to have a mass $M_{BP}$ and its stiffness is distributed to become a part of the contact stiffness. Therefore, the contact stiffness in this model 100 is located in between the vibrator baseplate 70 and the ground. The contact stiffness here is defined as a group of "springs" ($kc_1$, $kc_2$, etc.) connecting the vibrator baseplate 70 and the ground 130, and the value depends on the number of "springs" ($kc_1$, $kc_2$, etc.) that physically connect the baseplate 70 and the ground during vibrator operation. Therefore, the contact stiffness is a variable stiffness.

As is known, partial decoupling often occurs as the vibrator 30 shakes at high frequencies due to the low rigidity of the vibrator baseplate 70. Such decoupling becomes even worse on uneven ground. When the vibrator 30 is in a compressing mode, there are more contact areas between the vibrator baseplate 70 and the ground. More contact areas mean more "springs" and more stiffness in the model 100.

As the vibrator 30 goes to a releasing mode, however, partial decoupling may happen. This means that the baseplate 70 loses some contact with the ground so that the contact stiffness is reduced. The contact stiffness is reduced halfway through the compression cycle until halfway through the release cycle, and its value decreases as the sweep frequency increases. When the vibrator 30 is located on uneven ground, the vibrator baseplate 70 is subject to many motions such as bending, flexing, and twisting so that the contact stiffness becomes more unpredictable, and harmonic distortion becomes more severe.

In the model 100 of FIG. 4, the coupling system 110 attempts to describe the coupling conditions at the interface between the baseplate 70 and the coupled ground system 120. The coupling system 110 can be modeled by a group of springs $kc_1$, $kc_2$, ..., $kc_n$ and a damper $D_c$. In this system 120, the springs $kc_1$, $kc_2$, ..., $kc_n$ connect the vibrator's baseplate 70 and the coupled ground system 120 and are used to represent the variant contact stiffness in between the baseplate 70 and the coupled ground system 120 during operation of the vibrator 30. Notably, the baseplate's stiffness is separated as a number of small local stiffness coefficients distributed to join with these springs $kc_1, kc_2, \ldots, kc_n$ depending on the contact area between the baseplate 70 and the coupled ground. The damper $D_c$ represents the viscosity of the surface medium (e.g., thin layer of vegetation or grass on the ground).

For its part, the coupled ground system 120 in FIG. 4 is described as an inhomogeneous and elastic system and can be represented by a mass-spring-damper model. This system 120 is inhomogeneous because the values of the captured ground mass $M_g$, the ground stiffness $K_g$, and the ground viscosity $D_g$ vary from location to location. When loaded to the vibrator's baseplate 70 during vibration, this system 120 (and especially the captured ground mass $M_g$) joins with the baseplate 70 and becomes a part of the vibration source.

At each vibrator shaking spot, the vibrator's baseplate 70 feels this coupled ground system 120, and the motion of this system 120 is embedded and detected in the baseplate acceleration data being recorded, as noted previously. The three parameters $M_g$, $K_g$, and $D_g$ of this ground coupled system 120 can be estimated using vibrator field measurements as described in more detail later. Fortunately, this system 120 can be treated as an elastic linear system because the total effect of its nonlinearities may be small and may be ignored, especially when compared to the nonlinearities existing in the vibrator hydraulic system and the nonlinearities due to low rigidity of the baseplate 70.

The deep ground body 130 in FIG. 4 is described as a homogeneous and elastic system. In this deep ground body 130, the traveled wavelet remains practically invariant. In particular, experimental testing can show that far-field wavelets remain invariant in deep ground and that the deep ground can be treated homogenously and elastically.

All of the systems 30, 110, 120 combined together make up the vibrator-coupled ground model 100. Additional details of the ground model 100 can be found in Zhouhong Wei, "Modeling and modal analysis of seismic vibrator baseplate," *Geophysical Prospecting*, 58, 19-31 (2010), which is incorporated herein by reference in its entirety.

C. Vibrator-Coupled Ground Filter

Figure 5:
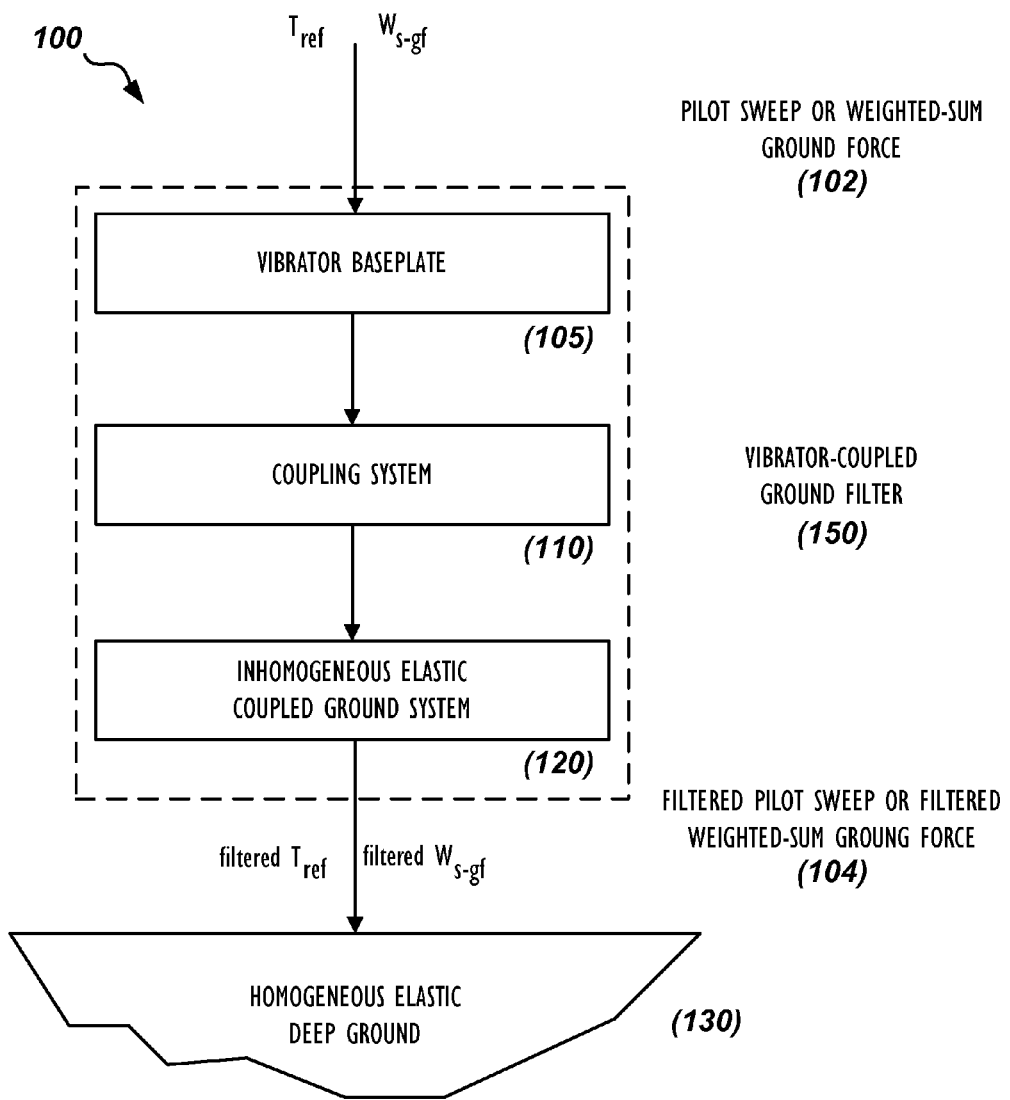
FIG. 5 schematically illustrates a vibrator-coupled ground filter according to the present disclosure.

Given the vibrator-coupled ground model 100 of FIG. 4, the block diagram of FIG. 5 shows particular details to be quantified in the vibrator-coupled ground model 100 for creating a vibrator-coupled ground filter 150 for use in the purposes disclosed herein. Essentially, the vibrator-coupled ground filter 150 of FIG. 5 contains the vibrator's baseplate system 105, the coupling system 110, and the inhomogeneous elastic coupled ground system 120 expressed in formulas. This vibrator-coupled ground filter 150 is minimum phase.

In the ground filter 150, the vibrator's baseplate system 105 can be represented by the following transfer function:

$$G_1(s) = \frac{M_{bp}s^2 + D_c s + K_c}{s^2}$$

In this baseplate system 105, $M_{bp}$ is the mass of the vibrator baseplate (70), $D_c$ is the contact viscosity of the coupling system 110, and $K_c$ is the contact stiffness of the coupling system 110, which consists of many small springs.

For its part, the coupling system 110 in the ground filter 150 can be represented by the following transfer function:

$$G_2(s) = \frac{D_c s^2 + 2D_c K_c s + K_c^2}{s^2}$$

Finally, the coupled ground system 120 in the ground filter 150 can be represented by the following transfer function:

$$G_3(s) = \frac{1}{M_g s^2 + D_g s + K_g}$$

In the coupled ground system 120, $M_g$ is the mass of the captured ground mass, $D_g$ is the contact viscosity, and $K_g$ is the contact stiffness for the captured ground.

Thus, the vibrator-coupled ground filter 150 is based on the transfer functions of these systems $G_1(s)$, $G_2(s)$, and $G_3(s)$, as well as the variables for $M_{bp}$, $D_c$, $K_c$, $M_g$, $D_g$, $K_g$, etc.

Input 102 to the ground filter 150 includes either a pilot sweep ($T_{ref}$) or a weighted-sum ground force ($W_{s\text{-}gf}$), which are supplied by the vibrator (30). The weighted-sum ground force ($W_{s\text{-}gf}$) is characterized by the equation:

$$W_{s\text{-}gf} = M_{rm} \times Acc_{rm} + M_{bp} \times Acc_{bp}$$

Therefore, the weighted-sum ground force ($W_{s\text{-}gf}$) is determined by the masses $M_{rm}$ and $M_{bp}$ of the reaction mass (50) and baseplate (70), which are known, and the acceleration data $Acc_{rm}$ and $Acc_{bp}$ of the reaction mass (50) and baseplate (70) recorded at the vibrator (30).

Output 104 of the ground filter 150 includes a filtered pilot signal (filtered $T_{ref}$) or a filtered weighted-sum ground force (filtered $W_{s\text{-}gf}$). This output 104 is used by the ground filter system (94) of FIG. 3 to filter the seismic data (92) of the recorder (90) before processing by the data processing system (98) so that the seismic data is processed with the more accurate vibrator-captured ground model 100 of the present disclosure. In turn, for example, the filtered weighted-sum ground force (filtered $W_{s\text{-}gf}$) can give better cross-correlated results between the vibrator's seismic energy and the seismic sensor responses and can reduce noise.

As discussed earlier, the dynamic motions related to the coupling condition and the inhomogeneous and elastic coupled ground system 120 are recorded and embedded in the baseplate acceleration data $Acc_{bp}$ supplied by the vibrator (30) to the recorder (90). In addition, the motion of the vibrator's actuator (e.g., hydraulic system) is recorded and embedded in the reaction mass acceleration data $Acc_{rm}$ supplied by the vibrator (30) to the recorder (90). As noted above, the vibrator measurements $Acc_{bp}$ and $Acc_{rm}$ are often recorded during data acquisition as the weighted-sum ground force ($W_{s\text{-}gf}$) using the recorder (90). To obtain the required variables for the vibrator-coupled ground filter 150, the dynamic motions of the coupling system 110 and the coupled ground system 120 are extracted from the baseplate and reaction mass acceleration data $Acc_{bp}$ and $Acc_{rm}$ as described below.

D. Derivation of Filter Values

Figure 6A:
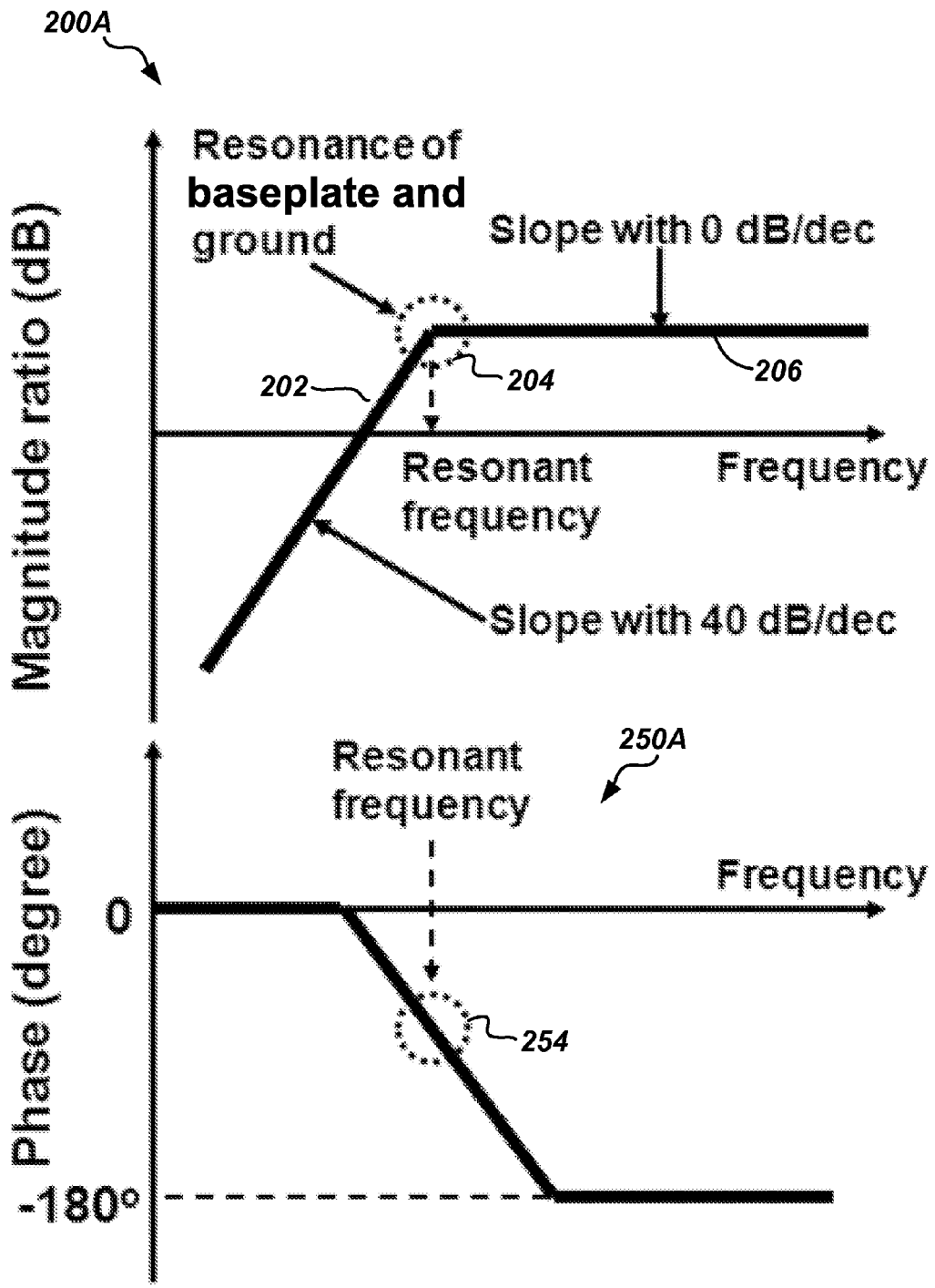
FIG. 6A graphs a theoretical frequency response of reaction mass acceleration and baseplate acceleration where reaction mass acceleration is the input and baseplate acceleration is the output.

FIG. 6A shows an example frequency response for a vibrator. In this frequency response, the reaction mass acceleration $Acc_{RM}$ is used as an input signal, and baseplate acceleration $Acc_{BP}$ is used as output responding to the input signal based on the ground model's transfer functions described previously. Thus, the frequency response in FIG. 6A is based on the following:

$$G(s) = \frac{Acc_{BP}(s)}{Acc_{RM}(s)}$$

In other words, the frequency response of the vibrator is analyzed with the reaction mass acceleration data as input and with the baseplate acceleration as output. The inverse could also be done so that a frequency response can be analyzed with the baseplate acceleration data as input and with the reaction mass acceleration as output. Although the frequency responses would appear different, it is understood that the frequency response analysis can generally relate the reaction mass acceleration data and the baseplate acceleration data as input and output relative to one another.

The magnitude plot 200A shows the magnitude ratio (dB) of $Acc_{BP}$ to $Acc_{RM}$ relative to frequency, and the phase plot 250A shows the phase (degrees) relative to frequency. As shown in the magnitude plot 200A, the magnitude ratio increases at a sloped section 202 of about 40 dB/dec as frequency increases. The magnitude ratio then reaches a turning point 204 at a resonant frequency between the baseplate (70) and the ground. Beyond this turning point 204, the magnitude ratio flattens out to a sloped section 206 of 0 dB/dec. The phase in the phase plot 250A shifts from 0 degrees to −180 degrees. At the resonant frequency 254, the phase is expected to be −90 degrees.

In the frequency response, the turning point 204 is defined by the values of $M_g$, $K_g$, and $D_g$ in the coupled ground system (120; FIGS. 3-4). The subsequent plateau section 206 is defined by the values of $k_{c1}$, $k_{c2}$, $D_{c1}$, and $D_{c2}$ of the coupling system (110; FIGS. 3-4). Knowing this theoretical nature of the frequency response having reaction mass acceleration $Acc_{RM}$ as input and baseplate acceleration $Acc_{BP}$ as output, an actual measured frequency response from measured data can be compared to the disclosed ground model 100 to derive values for $M_g$, $K_g$, $D_g$, $k_{c1-2}$, $D_{c1-2}$ for the vibrator-coupled ground filter 150.

Figure 6B:
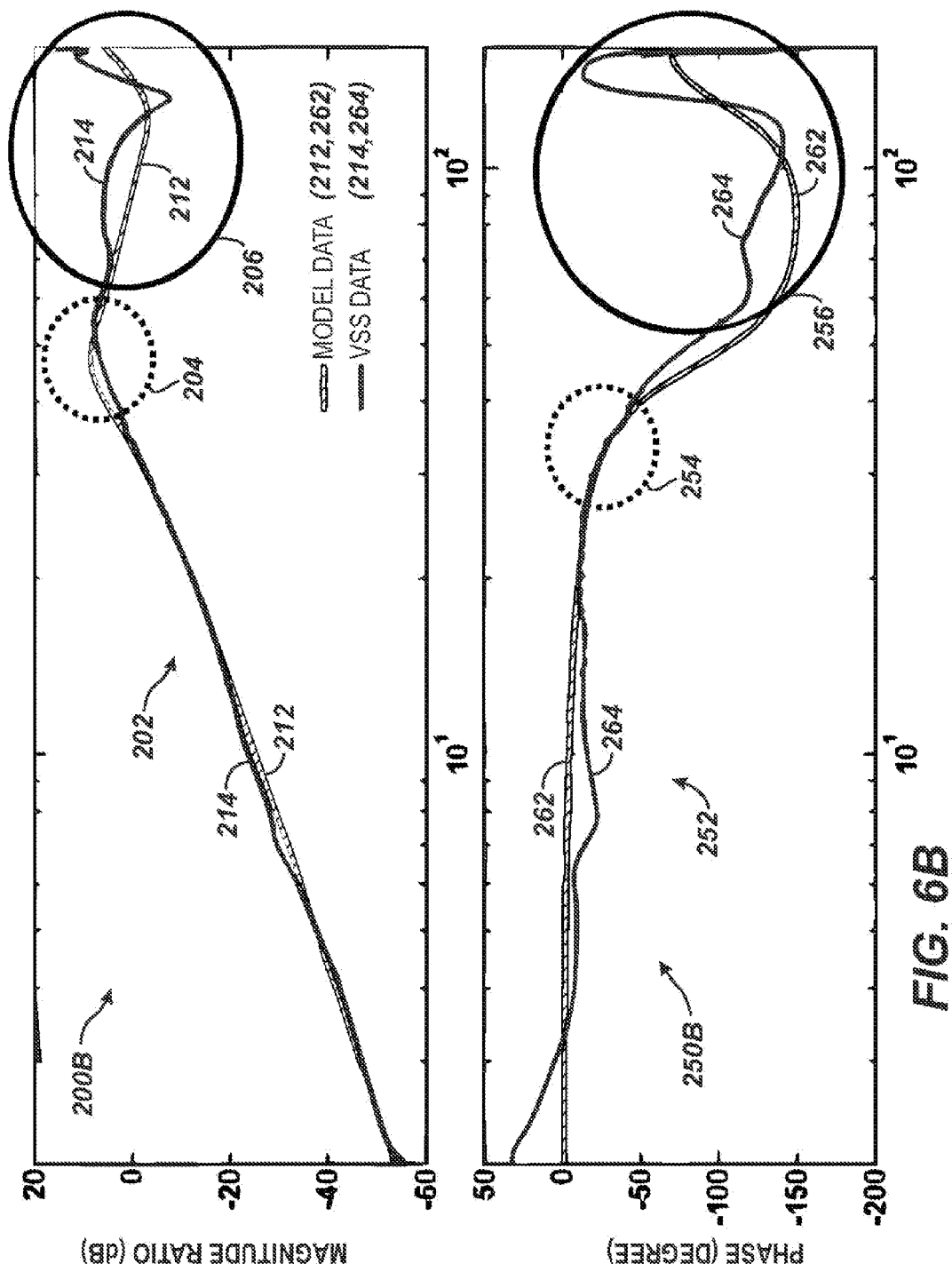
FIG. 6B graphs a frequency response of reaction mass acceleration and baseplate acceleration using data recorded on a standard vibrator, where the reaction mass acceleration is input and the baseplate acceleration is output.

To that end, FIG. 6B shows a measured frequency response using example vibrator measurement data 214 compared to model data 212 using the disclosed ground model 100. In these frequency responses, reaction mass acceleration data $Acc_{rm}$ is again used as an input signal, and baseplate acceleration data $Acc_{bp}$ is used as output responding to the input signal.

For the measured frequency response curves 214/254, the baseplate and reaction mass accelerations $Acc_{bp}$ and $Acc_{rm}$ have been measured and recorded on a standard vibrator (30) using a recorder (90). The measured frequency response curves 214/254 in FIG. 6B are then compared to model frequency response curves 212/252 generated by the model data using the disclosed ground model 100.

The values for the variables ($M_g$, $K_g$, $D_g$) in the ground model filter 150 are then obtained by successively modeling the measured frequency response seen in the measured data 214. In the magnitude plot 200B, the magnitude ratio spectra of the measured and model data curves 212/214 are shown. In the phase plot 250B, the corresponding phase spectra curves 262/264 are shown. The plots 200B/250B show that the model data curves 212/262 track the measured curves 214/264. Based on this, it can be seen that the main dynamic motions have been captured by the disclosed ground model 100, although some discrepancies are visible in these plots.

In both magnitude-ratio and phase spectra plots 200B/250B, first regions 204/254 show the main resonance produced by the baseplate (30) and the coupled ground system 110, which corresponds to flexure of the baseplate (30). In both magnitude-ratio and phase spectra plots 200B/250B, the second regions 206/256 illustrate the dynamic modes resulting from the coupling system 110.

Figures 7, 8:
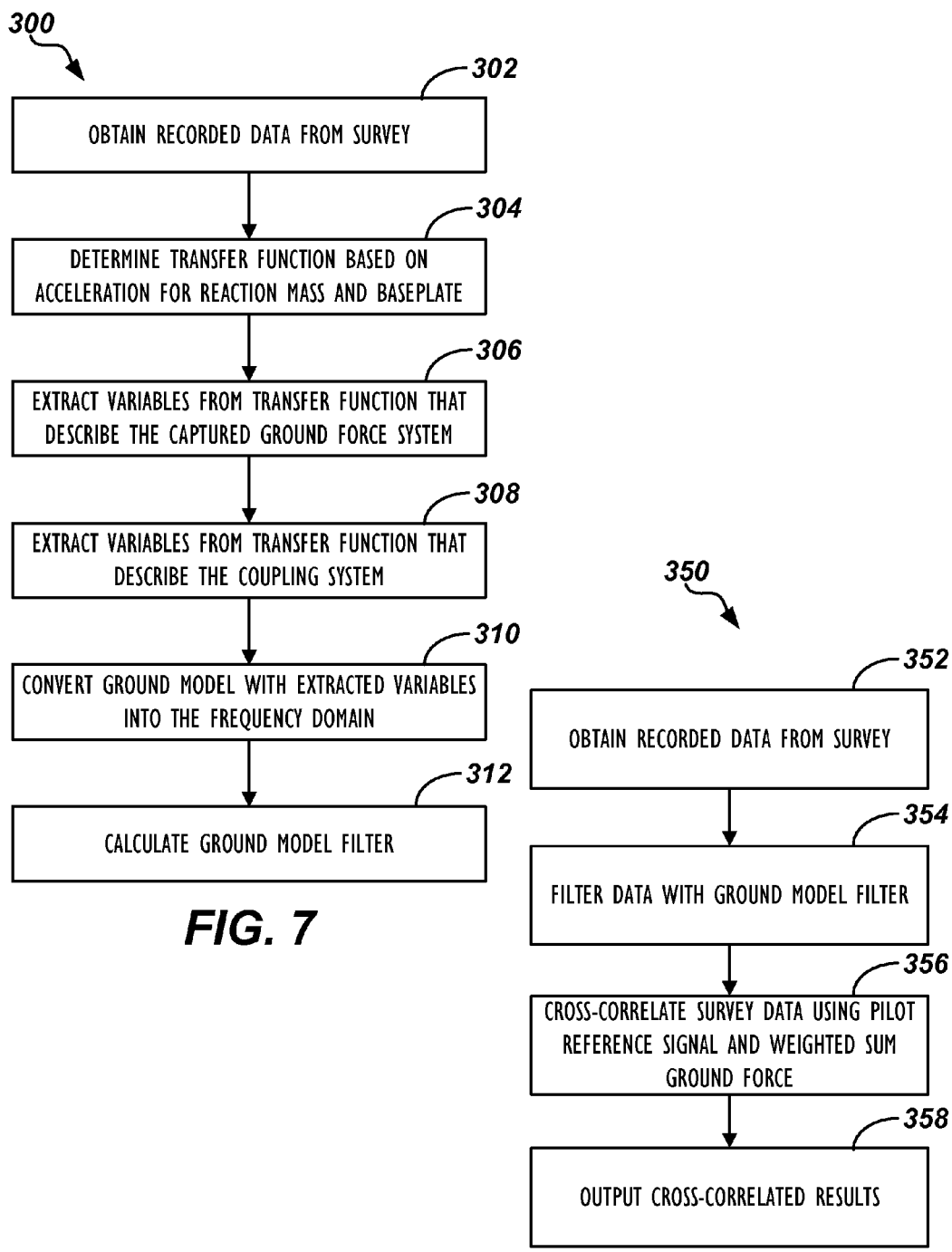
FIG. 7 shows a process for deriving the vibrator-coupled ground filter of the present disclosure.
FIG. 8 shows a process for using the vibrator-coupled ground filter of the present disclosure.

Based on this understanding of the frequency responses, values for the vibrator-coupled ground filter 150 can be derived. FIG. 7 shows a process 300 for deriving the vibrator-coupled ground filter 150 of the present disclosure.

Initially, recorded data from a survey is obtained (Block 302). As noted above, this data includes the seismic signals obtained with the sensors (22) in the array (12) as in FIG. 3. Likewise, this data includes the pilot signal ($T_{ref}$) and the weighted-sum ground force ($W_{s-gf}$), which includes the reaction mass and baseplate accelerations $Acc_{bp}$ and $Acc_{rm}$.

The acceleration data $Acc_{bp}$ and $Acc_{rm}$ for the reaction mass (50) and baseplate (70) are input into the transfer functions of the systems (i.e., $G_1(s)$, $G_2(s)$, and $G_3(s)$) in the ground force model 100 (Block 304). (As noted previously, the dynamic motions related to the coupling conditions are recorded and embedded in the baseplate acceleration data $Acc_{BP}$. In addition, the motion of the vibrator's actuator system is recorded and embedded in the reaction mass acceleration data $Acc_{RM}$.)

Useful information for the variables of the ground model 100 is then obtained from knowledge of the frequency response (as in FIGS. 6A-6B) and the transfer functions $G_1(s)$, $G_2(s)$, and $G_3(s)$ for the system 100. In particular, variables that describe the captured ground force system 120 are extracted from the transfer functions $G_1(s)$, $G_2(s)$, and $G_3(s)$ (Block 306). These variables include $M_g$, $K_g$, and $D_g$. For a given vibrator, the values for these variables are generally known and would be expected to lie within some target range. Yet, given the dynamic nature of the vibrator's operation, the values vary dynamically. Using the transfer functions $G_1(s)$, $G_2(s)$, and $G_3(s)$ and numerical analysis, the appropriate values for the variables $M_g$, $K_g$, and $D_g$ can be derived. In particular, these variables $M_g$, $K_g$, and $D_g$ govern the first turning point 204/254 in the frequency response of FIG. 6B. Using polynomial fitting, the values for these variables $M_g$, $K_g$, and $D_g$ can then be derived from the first region of the frequency response.

Additionally, variables that describe the coupling system 110 are extracted from the transfer functions of the system (Block 308). These variables include $kc_{1-2}$ and $Dc_{1-2}$. For a given vibrator, the values for these variables $kc_{1-2}$ and $Dc_{1-2}$ are generally known and would be expected to lie within some target range. Yet, given the dynamic nature of the vibrator's operation, the values vary dynamically. Using the transfer functions $G_1(s)$, $G_2(s)$, and $G_3(s)$ and numerical analysis, the appropriate values for the variables $kc_{1-2}$ and $Dc_{1-2}$ can be derived. In particular, these variables $kc_{1-2}$ and $Dc_{1-2}$ govern the second region 206/256 in the frequency response of FIG. 6B past the turning point 204/254. Using polynomial fitting, the values for these variables $kc_{1-2}$ and $Dc_{1-2}$ can then be derived from the second region of the frequency response for the ground model 100.

At this point, the derived values for the variables $M_g$, $K_g$, $D_g$, $kc_{1-2}$, and $Dc_{1-2}$ as well as the mass of the baseplate $M_{BP}$ are input into transform functions to convert the transfer functions $G_1(s)$, $G_2(s)$, and $G_3(s)$ into the frequency domain. Using standard mathematical techniques, the ground model with extracted variables is then converted into the frequency domain (Block 310) so the desired vibrator-coupled ground model filter 150 can be calculated (Block 312).

E. Data Processing Using Filter

FIG. 8 shows a process 350 for using the vibrator-coupled ground filter 150 of the present disclosure. As is typically, the array (12) and recorder (90) of FIG. 3 obtain recorded data from a survey as discussed previously (Block 352). At some point, the seismic data (92) is to be handled by the data processing system (98). To improve the subsequent imaging produced by the data processing system (98), the system filters the original seismic data (92) with the ground filter system (94) using the vibrator-coupled ground filter 150 of the present disclosure (Block 354).

The improved data (96) can then be provided to the data processing system (98). In turn, the data processing system (98) can use its correlation processor to cross-correlate survey data using the filtered pilot reference signal (filtered $T_{ref}$) or filtered weighted sum ground force (filtered $W_{s-gf}$) (Block 356). The system (98) can then output the cross-correlated results, which can then be used for imaging purposes (Block 358).

F. Analyses and Results

As depicted in FIG. 5, when the input 102 (either the pilot sweep $T_{ref}$ or the weighted-sum ground force $W_{s-gf}$) is injected into the vibrator-coupled ground filter 150, it is passed through transfer functions corresponding to the vibrator's baseplate system 105, the coupling system 110, and the elastic coupled ground system 120. This means that the input 102 (the pilot sweep or the weighted-sum ground force) will be sequentially filtered by these systems (105, 110, 120). The output 104 from the vibrator-coupled ground filter 150 becomes the filtered pilot sweep (filtered $T_{ref}$) or the filtered weighted-sum ground force (filtered $W_{s-gf}$), which is the expected input to the deep ground (130) by the vibrator 30. In other words, the wavelet produced by the cross-correlation function between the input 102 (pilot sweep or the weighted-sum ground force) and the output 104 (the filtered pilot sweep or the filtered weighted-sum ground force) will be indicative of an accurate wavelet that travels through the deep ground 130. It should be in phase with the downhole wavelets except for a time shift.

Figure 9:
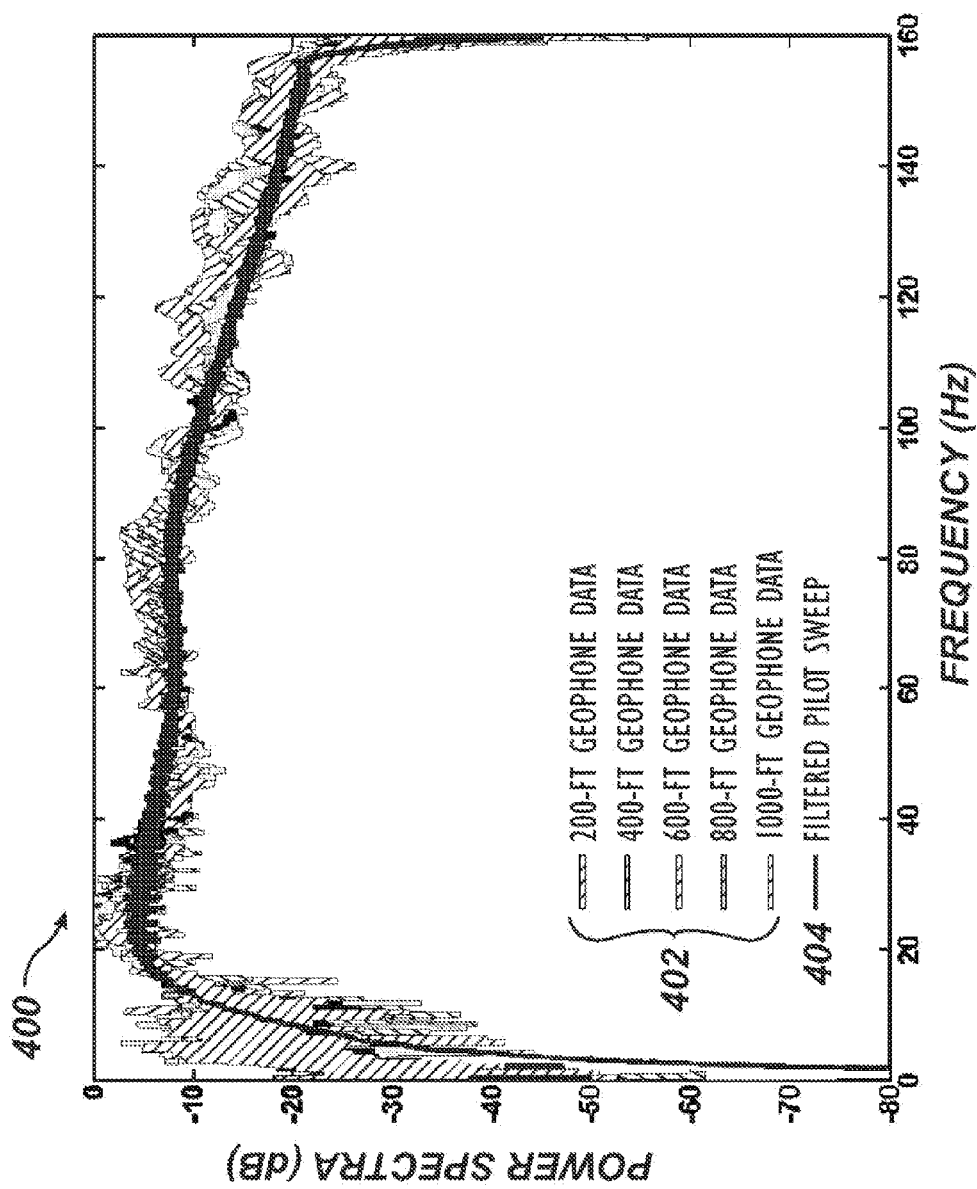
FIG. 9 graphs power spectra of downhole geophones at different depths and with the filtered weighted-sum ground force.

To test the results, the graph 400 in FIG. 9 plots amplitude spectra 402 from six downhole geophones and the amplitude spectrum 404 from a filtered pilot sweep (filtered $T_{ref}$). The downhole geophone spectra 402 have been recorded using a standard vibrator driven by a linear sweep from 2 Hz to 160 Hz in 20 seconds. This linear sweep (pilot sweep) has been recorded as well. The downhole geophone spectra 402 plotted in FIG. 9 are selected in 200 ft (60.96 m) intervals from 200 ft (60.96 m) to 1000 ft (304.8 m).

The filtered pilot sweep spectrum 404 is obtained by passing the pilot sweep through the vibrator-coupled ground filter 150. It is observed that the amplitude spectrum 404 of the filtered pilot sweep (filtered $T_{ref}$) matches very well with the amplitude spectra 402 from six downhole geophones. This indicates that the filtered pilot sweep (filtered $T_{ref}$) is in the downgoing wavelet. Furthermore, the vibrator-coupled ground filter 150 does appear to accurately describe the filtering effects caused by the vibrator (30), the coupling condition between the baseplate (70) and the coupled ground, and the coupled ground system (120).

Figure 10:
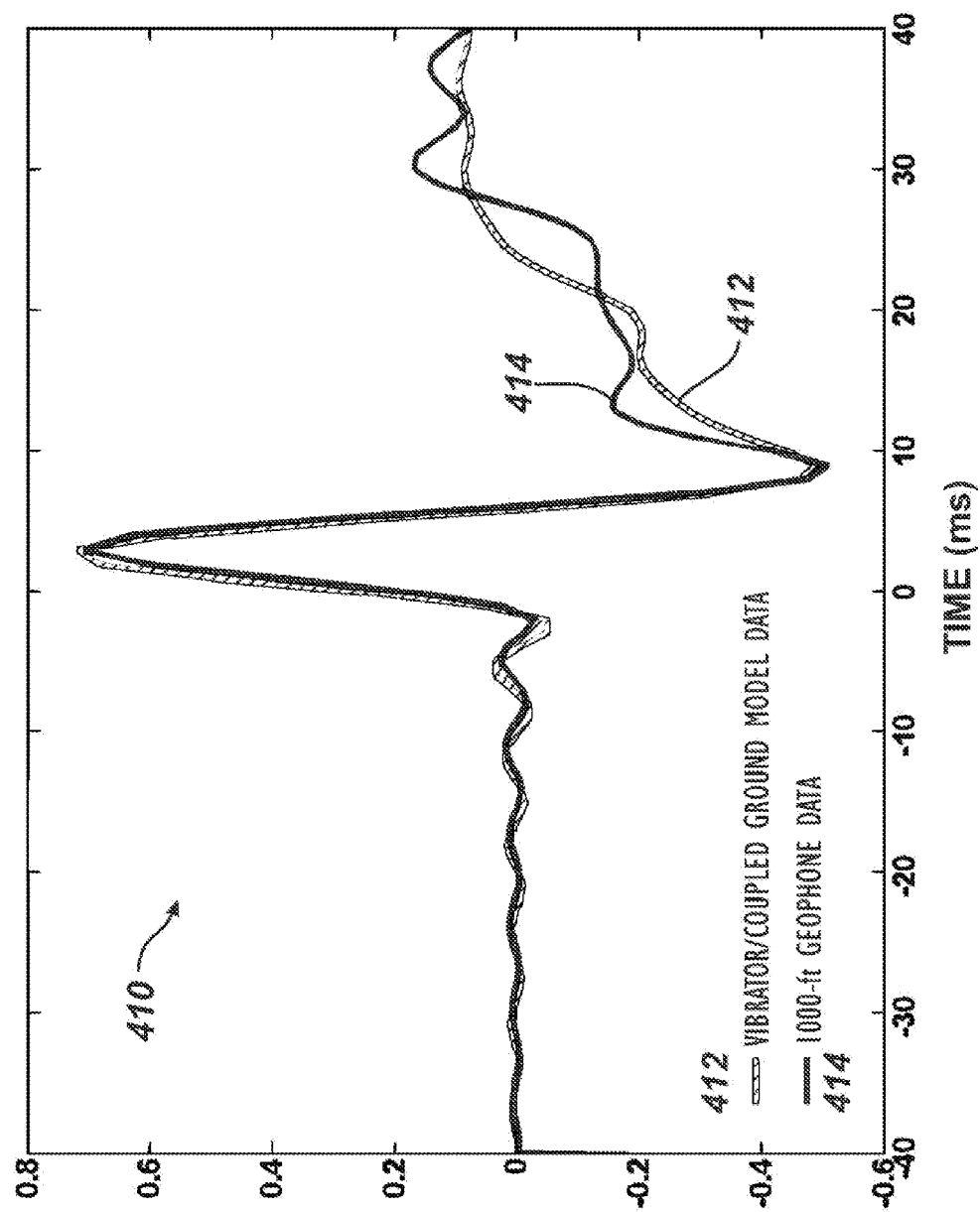
FIG. 10 graphs wavelets produced by a pilot sweep cross-correlated with 1000-ft (304.8 m) geophone data and with the vibrator-coupled ground model data, respectively.

The plot 410 in FIG. 10 provides another example and shows a comparison of two wavelets 412/414. One wavelet 414 is produced by the cross-correlation between an original pilot sweep and the 1000 ft (304.8 m) downhole geophone data. Compensation for time delay of this wavelet 414 is made to provide a better comparison. The other wavelet 412 is the result of the cross-correlation function between the pilot sweep ($T_{ref}$) and the filtered pilot sweep (filtered $T_{ref}$), which is labeled as the Vibrator-Coupled Ground Model data 412 in FIG. 10. The two wavelets 412/414 match very well. The similarity of two wavelets 412/414 further confirms that the vibrator-coupled ground model 100 of the present disclosure is a reasonable model and each sub-model 110, 120, etc. can be used to represent its own system.

Standard Vibroseis theory indicates that far-field particle velocity is proportional to a time differential of a true ground force. Again, this theory is built on an assumption that the ground can be treated as an isotropic homogeneous elastic body. As demonstrated above, the deep ground can be assumed to be a relatively homogeneous and elastic body 130, at least in the P-wave direction. However, the coupled ground system 120 of FIGS. 4-5 is definitely not a homogeneous body. Therefore, standard Vibroseis theory should be modified slightly to allow for the more realistic situation. The far-field particle velocity is proportional to the input of the deep ground 130, which is the output 104 of the pilot sweep ($T_{ref}$) or the weighted-sum ground force ($W_{e-gf}$) after it has passed through the vibrator-coupled ground model filter 150.

Figure 11A:
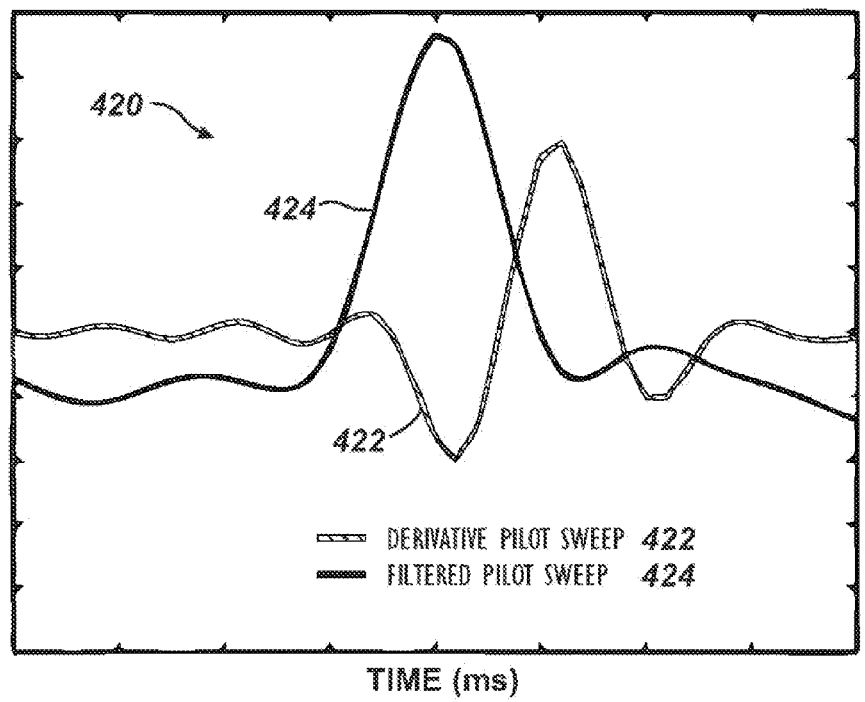
FIG. 11A graphs a cross-correlation of the derivative of the pilot sweep with the 1000-ft downhole geophone data and a cross-correlation of the filtered pilot sweep with the 1000-ft downhole geophone data using standard vibrator modeling.
Figure 11B:
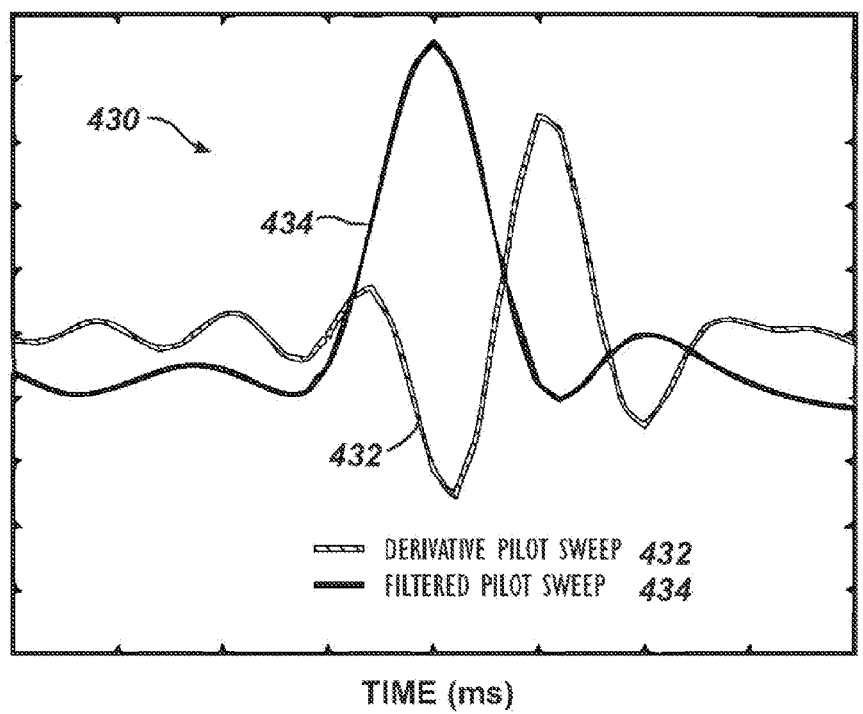
FIG. 11B graphs a cross-correlation of the derivative of the pilot sweep with the 1000-ft downhole geophone data and a cross-correlation of the filtered pilot sweep with the 1000-ft downhole geophone data using modified vibrator modeling.

FIGS. 11A-11B depict comparisons of wavelets generated by using the derivative of the pilot sweep ($T_{ref}$) as well as the filtered pilot sweep (filtered $T_{ref}$). In plot 420 of FIG. 11A, wavelets 422/424 were obtained using the standard vibrator modeling. In plot 430 of FIG. 11B, wavelets 432/434 were obtained from the modified vibrator modeling of the present disclosure. Curves 422/432 are produced by cross-correlating the derivatives of the pilot sweeps ($T_{ref}$) with the 1000-ft (304.8 m) downhole geophone traces. The curves 424/434 are results of the cross-correlation function between the filtered pilot sweeps (filtered $T_{ref}$) and the 1000-ft (304.8 m) downhole geophone traces. FIGS. 11A-11B clearly demonstrates that the zero-phase wavelets can be obtained when the filtered pilot sweep (filtered $T_{ref}$) was cross-correlated to the downhole geophone data.

Figure 12A:
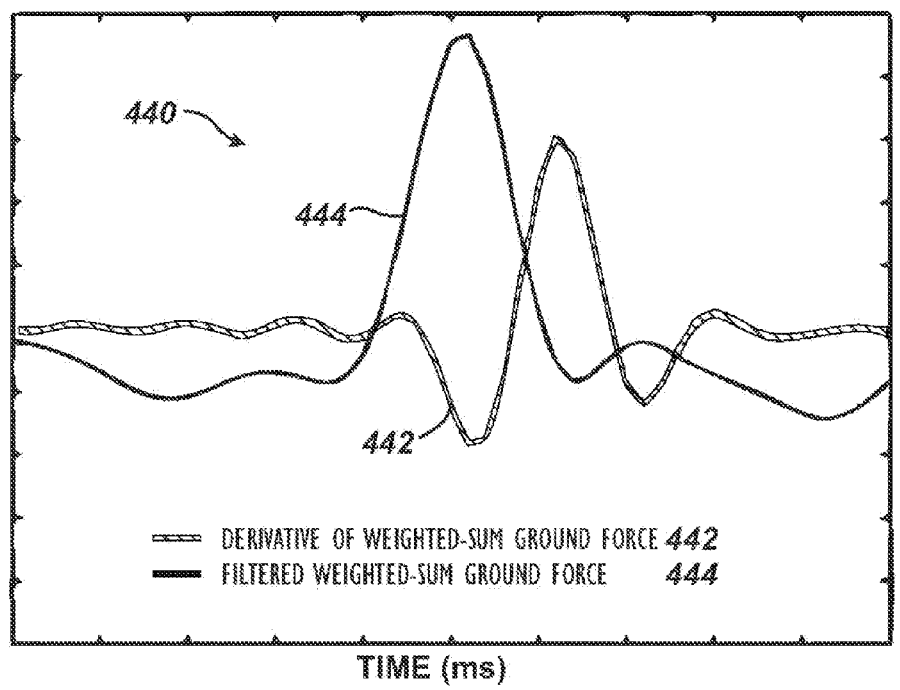
FIG. 12A graphs a cross-correlation of the derivative of the weighted-sum ground force with the 1000-ft downhole geophone data and a cross-correlation of the filtered weighted-sum ground force with the 1000-ft downhole geophone data using the standard vibrator modeling.
Figure 12B:
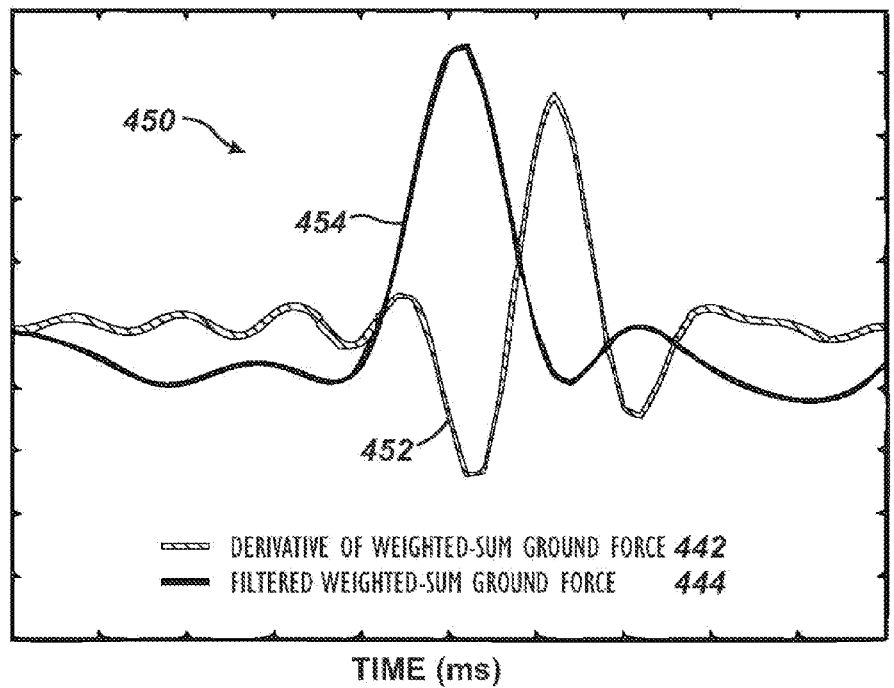
FIG. 12B graphs a cross-correlation of the derivative of the weighted-sum ground force with the 1000-ft downhole geophone data and a cross-correlation of the filtered weighted-sum ground force with the 1000-ft downhole geophone data using modified vibrator modeling.

FIGS. 12A-12B depict another representative example to show that the Vibrator-Coupled Ground Model 100 can describe the filtering effects seen in a Vibroseis wavelet caused by the vibrator-coupled ground system. These plots 440/450 depict the wavelets obtained by using the derivative of the weighted-sum ground force ($W_{s-gf}$) as well as the filtered weighted-sum ground force (filtered $W_{s-gf}$). In the plot 440 of FIG. 12A, the wavelets 442/444 are generated using the standard vibrator modeling. In the plot 450 of FIG. 12B, the wavelets 452/454 are produced by using the modified vibrator modeling. Once again, the wavelets 442/452 are produced when the derivatives of the weighted-sum ground force ($W_{s-gf}$) was cross-correlated with the 1000-ft (304.8 m) downhole geophone traces. The other wavelets 444/454 are resulted from the cross-correlation of the filtered weighted-sum ground force (filtered $W_{s-gf}$) with the 1000-ft (304.8 m) downhole geophone traces.

FIGS. 12A-12B show that the zero-phase wavelets can be obtained when the filtered weighted-sum ground force (filtered $W_{s-gf}$) was used to cross-correlate to the downhole geophone data. It can be observed that the wavelets in FIGS. 12A-12B delay slightly comparing to the wavelets in FIGS. 11A-11B. This tiny time-delay is due to the phase error between the pilot sweep ($T_{ref}$) and the weighted-sum ground force ($W_{s-gf}$).

Figure 13:
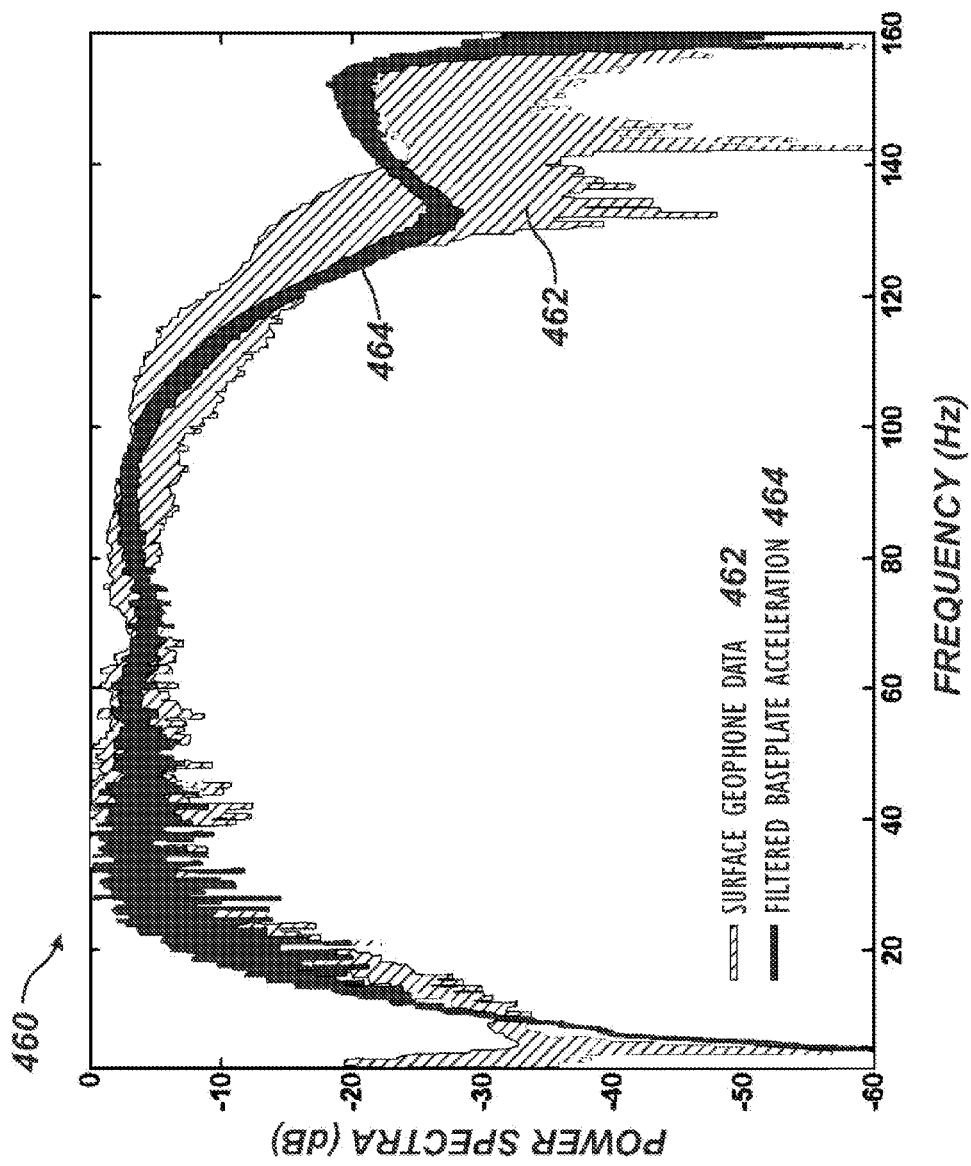
FIG. 13 graphs a comparison in amplitude spectra of a surface geophone and the velocity computed from baseplate accelerometer data.

To prove the validity of the vibrator-coupled ground model 100 shown in FIG. 4 and determine the robustness of the vibrator-coupled ground filter 150 shown in FIG. 5, another experimental test was performed in a completely different area from the downhole geophone site. FIG. 13 shows an amplitude spectrum 460 comparing data recorded in an experimental test using a standard vibrator modeling. The curve 462 is produced from a surface geophone that was placed 1-m apart from the vibrator baseplate (70). The curve 462 represents the velocity power spectrum of particles where the surface geophone is located. The spectrum 460 was computed after geophone response removal.

Because the baseplate accelerometer is mounted on the top cross of the baseplate stilt structure, the signal recorded by the baseplate accelerometer needs to physically pass through the baseplate (70), the coupling system (110), and the coupled ground system (120) in order to connect with any nodes in the coupled ground system (120). Additionally, because the surface geophone records the particle velocity, it makes more sense to convert the baseplate acceleration into the baseplate velocity. Therefore, the other curve 464 is calculated from the data output from the vibrator-coupled ground filter 150 where the input to the filter 150 is the baseplate velocity, which is obtained by integrating the baseplate acceleration.

As can be seen, the curve 464 in the amplitude spectrum 460 obtained by utilizing the baseplate acceleration matches closely with the amplitude spectrum produced by using the surface geophone trace. FIG. 13 indicates that the vibrator-coupled ground model 100 can simulate the filtering effects caused by the baseplate (70) and its vicinity. Moreover, it demonstrates that the coupled ground is a part of the source.

Portions of the present disclosure may be implemented in terms of logic, software, or code typically encoded on a variety of media including, but not limited to, computer-readable media, machine-readable media, program storage media, or computer program product. Such media may be handled, read, sensed, and/or interpreted by a computing device having a processor. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 14:
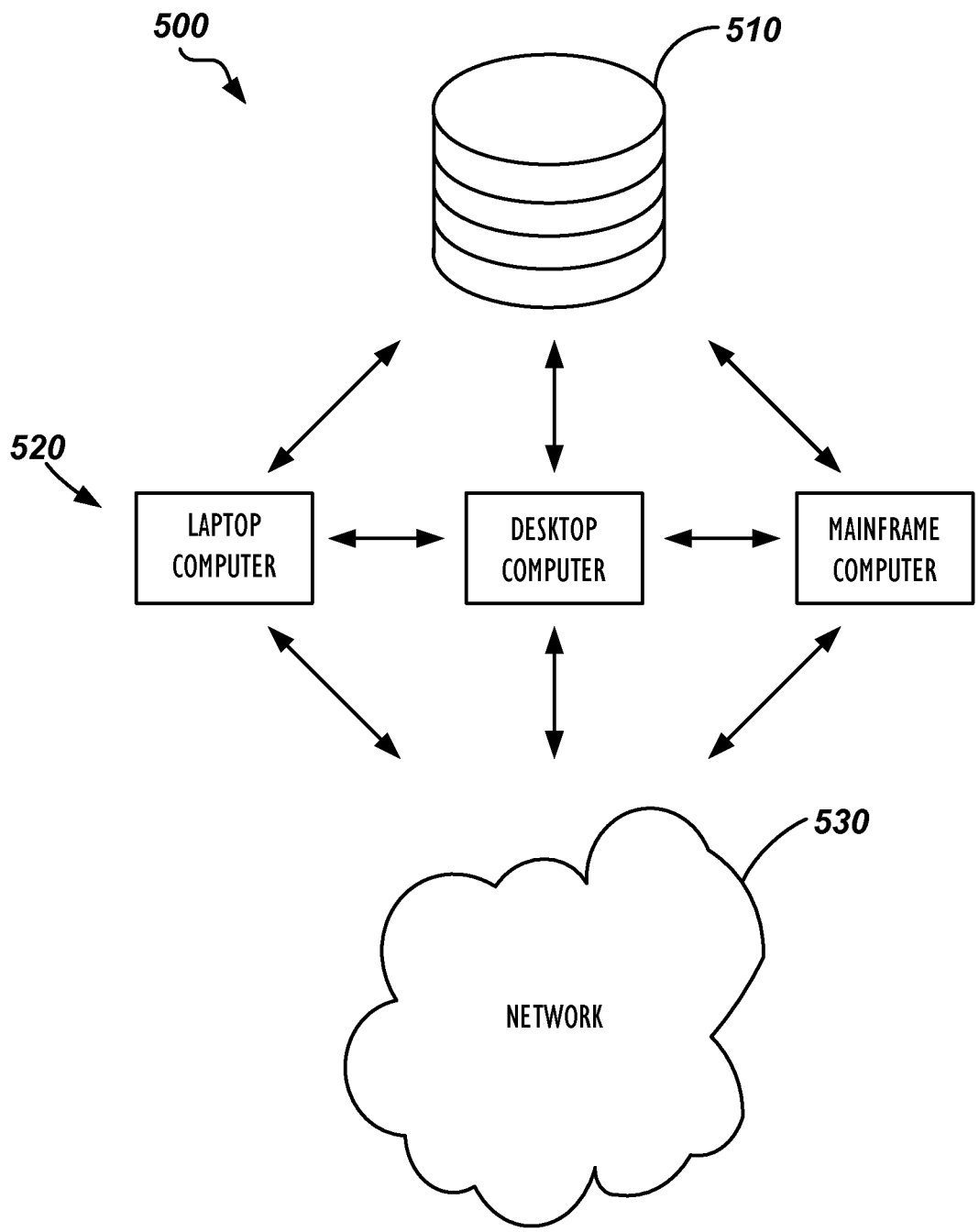
FIG. 14 shows a geophysical information processing system that can be used in accordance with the present disclosure.

For example, FIG. 14 shows a geophysical information processing system 500 that can be used in accordance with the present disclosure. Geophysical information may be received by the geophysical information processing system 500 after being gathered by a geophysical information collector such as the collector or recorder 90 as described above and shown in FIG. 3. The information collector 90 can include one or more or any combination of the components shown in FIG. 14. In one example, the geophysical information processing system 500 may include one or more processing devices, such as a computer 520 with a storage device 510. The computer 500 can be, but is not limited to, a laptop computer, a desktop computer, a mainframe, or the like. The computer 520 may be in communication with the storage device 510 via any known interface and an interface for entering information into the computer 520 may be any acceptable interface. For example, the interface may include the use of a network interface 530.

The storage device 510 can be any useful storage device having a computer-readable media. Instructions for carrying out methods described herein may be stored on computer-readable media in the computer 520 or may be stored on an external storage device.

Imaging, as used herein includes any representation of a subsurface structure including, but not limited to, graphical representations, mathematical or numerical representation, strip charts or any other process output representative of the subsurface structure. Geophysical information as used herein means information relating to the location, shape, extent, depth, content, type, properties, and/or number of geologic bodies. Geophysical information includes, but is not necessarily limited to marine and land seismic information. Seismic information includes, but is not limited to, one or more or any combination of the following, analog signals, digital signals, recorded data, data structures, database information, parameters relating to surface geology, source type, source location, receiver location, receiver type, time of source activation, source duration, source frequency, energy amplitude, energy phase, energy frequency, wave acceleration, wave velocity and/or wave direction.

Seismic information may be gathered using sensors monitoring seismic activities using, for example, a system as described above and shown in FIG. 3. The seismic activities result from active energy sources, including vibrator devices. The sensors can include geophones, accelerometers, pressure sensors, single component sensors, and/or multi-component sensors.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A seismic data processing method, comprising:
measuring reaction mass acceleration data of a source of seismic energy with an accelerometer;
measuring baseplate acceleration data of the source with an accelerometer;
measuring seismic data with one or more seismic sensors responsive to the seismic energy of the source;
deriving, via a data processing system comprising one or more processing units, variables for a ground model by analyzing a frequency response relating the reaction mass acceleration data and the baseplate acceleration data as input and output relative to one another;
storing the ground model in memory operatively coupled to the data processing system;
filtering via the data processing system a source signal indicative of operation of the source by using the ground model with the derived variables; and
making the filtered source signal available for processing with the seismic data of the one or more seismic sensors via the data processing system;
wherein deriving the variables for the ground model comprises modeling a baseplate system of the source in the ground model with a first transform function based on a mass value $M_{bp}$ of a baseplate of the source, a damper value $D_c$ representative of a viscosity of a surface medium, and a stiffness valve $K_c$ representative of a contact stiffness of the ground model; and
wherein the first transform function comprises:

$$G_1(s) = \frac{M_{bp}s^2 + D_c s + K_c}{s^2}.$$

2. A seismic data processing method, comprising:
measuring reaction mass acceleration data of a source of seismic energy with an accelerometer;

measuring baseplate acceleration data of the source with an accelerometer;

measuring seismic data with one or more seismic sensors responsive to the seismic energy of the source;

deriving, via a data processing system comprising one or more processing units, variables for a ground model by analyzing a frequency response relating the reaction mass acceleration data and the baseplate acceleration data as input and output relative to one another;

storing the ground model in memory operatively coupled to the data processing system;

filtering via the data processing system a source signal indicative of operation of the source by using the ground model with the derived variables; and making the filtered source signal available for processing with the seismic data of the one or more seismic sensors via the data processing system;

wherein deriving the variables for the ground model comprises modeling a coupling system of the source in the ground model with a second transform function based a dampening value $D_c$ representative of a viscosity of a surface medium and a stiffness valve $K_c$ representative of a contact stiffness of the coupling system; and wherein the second transform function comprises:

$$G_2(s) = \frac{D_c s^2 + 2 D_c K_c s + K_c^2}{s^2}.$$

* * * * *